(12) United States Patent
Xu et al.

(10) Patent No.: US 7,046,874 B2
(45) Date of Patent: May 16, 2006

(54) INTEGRATED OPTICAL-POWER ADJUSTABLE WDM

(75) Inventors: Yuanzhong Xu, Wuhan (CN); Liping Sun, Wuhan (CN); Qianggao Hu, Wuhan (CN); Xiaoping Wu, Wuhan (CN); Shuihua Liu, Wuhan (CN)

(73) Assignee: Accelink Technologies Co., Ltd., Wuhan (CN)

( * ) Notice: Subject to any disclaimer, the term of this patent is extended or adjusted under 35 U.S.C. 154(b) by 0 days.

(21) Appl. No.: 11/019,544

(22) Filed: Dec. 23, 2004

(65) Prior Publication Data

US 2005/0152642 A1    Jul. 14, 2005

(30) Foreign Application Priority Data

Dec. 25, 2003    (CN) ........................ 200310111653 A

(51) Int. Cl.
G02B 6/28    (2006.01)

(52) U.S. Cl. ........................................ 385/24; 385/140

(58) Field of Classification Search .................. 385/14, 385/24, 37, 140, 147; 372/20, 102; 398/58–64, 398/82–88, 141–150

See application file for complete search history.

(56) References Cited

U.S. PATENT DOCUMENTS 6,724,971 B1 *   4/2004  Chang ........................ 385/140
6,905,255 B1 *   6/2005  Flanders et al. .............. 385/88

* cited by examiner

*Primary Examiner*—Phan Palmer
(74) *Attorney, Agent, or Firm*—Pillsbury Winthrop Shaw Pittman LLP

(57) ABSTRACT

An integrated optical-power adjustable WDM is provided, which has a plurality of channels, each channel having a first input port, a second output port and a third output port, the second output port of one channel being connected to the first output port of the next channel, the first port of each channel having a waveguide, the third port of each channel having a waveguide, each channel comprising a pair of collimating elements composed of a first collimating element and a second collimating element, a thin film filter and a tunable optical filter chip functioning as a variable optical attenuator, wherein the tunable optical filter chip is set between the thin film filter and the third output port for each channel, thereby the respective tunable optical filter chip is integrated into the corresponding internal optical path for each channel of WDM to achieve optical-power control for each channel of the WDM.

12 Claims, 5 Drawing Sheets

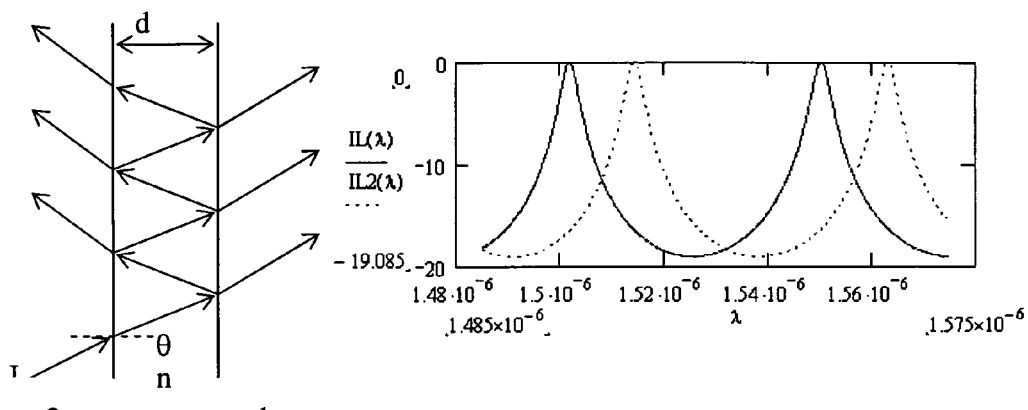
FIG.12A
FIG.12B
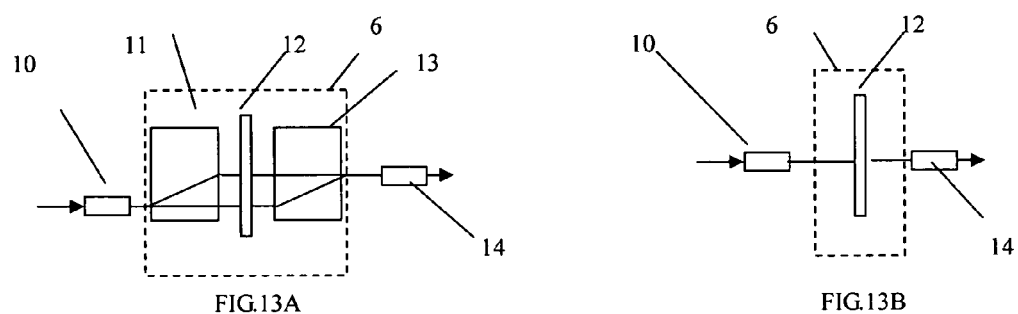
FIG.13A
FIG.13B
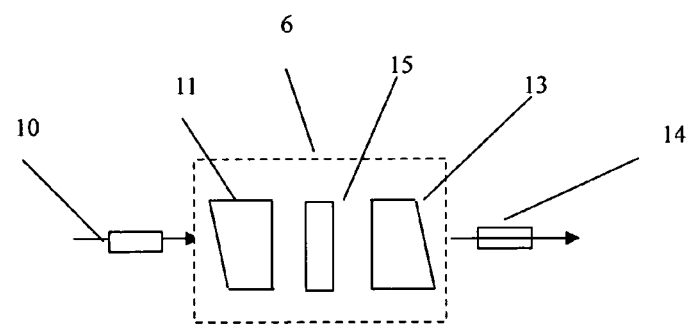
FIG.14

INTEGRATED OPTICAL-POWER ADJUSTABLE WDM

FIELD OF THE INVENTION

The present invention relates to a wavelength-division multiplexer (WDM) used in a wavelength-division multiplexing system, particularly to a multichannel optical power dynamic adjustable WDM implemented by integrating built-in tunable optical filter chips in a thin film filter based WDM.

BACKGROUND OF THE INVENTION

The WDM technology is still developing very fast. The use of optical amplifier in WDM network is common, but it makes the gain distribution of spectrum unequal. To make each channel of WDM having optical power control function can release the problem of optical signal noise ratio (OSNR) decreasing caused by disequilibrium of the optical power, which is brought about by optical signal transmission, multiplexing, and demultiplexing. The combination of separated WDM and optical power control device for each channel form VMUX (VOA(variable optical attenuator)+MUX) or VDMUX (VOA+DEMUX), and VMUX can dynamically equalize the optical power in terminal MUX or OADM devices. With regard to VDMUX, the optical power automatic gain control prior the terminal receiver can be achieved. At present optical power control technology related to discrete component mainly includes mechanical type, Planar Lightwave Circuit (PLC) technology, micro-electronic mechanical system, and liquid crystal technology etc. The common feature of these technologies is that the attenuation of the optical power can be controlled, but in terms of the application of the multichannel WDM system (for example, 40 channels commonly used), the disadvantage of high cost and large size exists. On one hand, the input and output for each channel requires to be coupled by optical fibers, which increases cost in two aspects. The first is about material cost, because a pair of V-groove pigtails is needed for the Planar Light wave Circuit technology, and a pair of collimators is needed for the micro-optics method. The second is about coupling cost, since the optical path of the optical devices used in optical communication is extremely precise and sensitive, the coupling cost accounts for more than half of the cost of general optical devices. On the other hand, the additional use of coupling pigtails or collimators increases the size and insertion loss of the devices.

As above mentioned, conventionally, VMUX is formed by combining VOAs for each discrete single channel or a VOA array and a MUX/DMUX, but it has the disadvantage of large size, high cost, and low integration level. FIG. 1 shows an overall schematic diagram of a conventional optical-power adjustable WDM. The optical-power adjustable WDM includes an input fiber waveguide 1, a variable optical attenuator 2, an optical power detecting PIN 3, a WDM wavelength division multiplexer 4, an output waveguide 5, and a control panel 6, and the optical power detecting PIN 3 is optional. This solution combines discrete VOAs and a MUX/DMUX, but has the defects that the formed VMUX/VDMUX is bulky; the variable optical attenuator for each channel is coupled to corresponding channel of the WDM by soldering, which will incur additional loss and the soldering joint need to be protected.

In order to reduce the cost and the size, WDM has to be integrated with optical power control device as one component. There are two kinds of mainstream WDM technologies relating to it, that is, Planar Lightwave Circuit (PLC) technology and micro-optics technology, the integration of optical power control and WDM requires putting the optical power control device into the WDM optical path directly. In terms of the PLC technology, such product has existed, for example, those provided by Bookham and Hitachi, but the relevant polarization dependent loss is large because of the limitation of the PLC Technology principle, while for the micro-optics technology, the integration encounters great problems, because the conventional VOA is large in size compared with WDM, as a result, there is no scheme proposed to achieve the optical power control of WDM by integrating an optical attenuator chip into the optical path of the WDM.

SUMMARY OF THE INVENTION

In order to overcome the above-mentioned problems, the present invention is proposed. The object of the present invention is to provide an integrated optical-power adjustable WDM which integrating an adjustable optical filter chip into a WDM.

In accordance with the present invention, an integrated optical-power adjustable WDM is provided, which has a plurality of channels, each channel having a first input port, a second output port and a third output port, the second output port of one channel being connected to the first output port of the next channel, the first port of each channel having a waveguide, the third port of each channel having a waveguide, each channel comprising a pair of collimating elements composed of a first collimating element and a second collimating element, a thin film filter and a tunable optical filter chip functioning as a variable optical attenuator, wherein the tunable optical filter chip is set between the thin film filter and the third output port for each channel, thereby the respective tunable optical filter chip is integrated into the corresponding internal optical path for each channel of WDM to achieve optical-power control for each channel of the WDM.

As a variable optical attenuator unit, the tunable optical filter chip is an electrically driven tunable optical filter chip, which can be a tunable optical filter chip based on MEMS F-P (Fabry-Perot) cavity, a tunable optical filter chip based on liquid crystal technology or a tunable optical filter chip based on magneto-optic technology. This kind of tunable optical filter chip is suitable for integrating into the thin film filter-based WDM.

Presently the technology of these adjustable optical filters has developed maturely. Commonly, the tunable filter is applied for choose the needed wavelength continuously or discontinuously, But for one specified wavelength, when the tunable filter is tuned, the tunable filter is functioned as one variable optical attenuator. The small size, the driving means, or the physical characteristics of these adjustable optical filter chips makes it easily integrated into the thin film filter based WDM module. The large wavelength dependent loss (WDL) existed in above-mentioned tunable optical filter chips is not a defect any longer and is beyond the mind of a user when said tunable optical filter chips are used in the internal optical path of the WDM, because the WDL is small and this WDL has rather little effect in the case that a single wavelength is applied or in the case that the operating wavelength band is narrow.

By integrating an adjustable optical filter chip with the WDM, the number of the components is reduced, thus the cost is lowered, and the size of the device is greatly reduced, meanwhile, the manufacturing process for the integrated optical-power adjustable WDM in accordance with the preset invention is simple while its performance is better than conventional VMUX/VDMUX, and no additional polarization dependent loss is introduced into the integrated optical-power adjustable WDM in accordance with the present invention.

BRIEF DESCRIPTION OF THE DRAWINGS

The present invention will become apparent from the following description of embodiments with reference to the accompanying drawing, in which same reference numbers denote the same or similar parts.

FIG. 12A is a schematic diagram showing structural features of the tunable optical filter chip based on F-P cavity.

FIG. 12B is a schematic diagram showing the attenuation curve of the tunable optical filter chip based on F-P cavity.

FIG. 13A and FIG. 13B are schematic diagrams showing the arrangement of the tunable optical filter chip based on liquid crystal technology.

FIG. 14 is a schematic diagram showing the arrangement of the tunable optical filter chip based on magneto-optical technology.

DETAILED DESCRIPTION OF THE PREFERRED EMBODIMENTS

The following is a detailed description of the embodiments of the present invention in conjunction with the accompanying drawings, wherein similar members are denoted by similar reference numbers.

In the embodiments of the present invention, the optical-power adjustable WDM is achieved by the integration of a thin film filter type WDM and a tunable optical filter chip.

The thin film filter type WDM has a plurality of channels, and the basic unit for each channel adopts double-optical fiber three ports arrangement. Each basic unit corresponds to an optical wavelength, and the modules composed of the basic unit for each channel, which are used for corresponding wavelengths, are cascaded to form the WDM. This arrangement allows a flexible configuration. A built-in tunable optical filter chip integrated in the basic unit for each channel can function as a variable optical attenuator, thereby achieving the integrated optical power dynamic adjustment for each channel. The first to fifth embodiments illustrate the integrated optical power dynamic adjustment of this kind of thin film filter type WDM. Although only one channel WDM is described in detail with reference to FIGS. 2–6, it is obvious for those skilled in the art that a multi-channel WDM can be achieved by cascading each channel of WDM.

Another common-use technical scheme of the thin film filter type WDM adopts free space optical path structure. An input light incident on a thin film filter from a certain angle, a specific wavelength is transmitted through the thin film filter and the other wavelengths are reflected onto a next thin film filter. This repetition achieves the wavelength division multiplexing of the wavelength. Tunable optical filter chips can also be set in this structure to achieve the integrated optical dynamic adjustment. There are five embodiments, that is, the sixth embodiment to the tenth embodiment, based on this structure. Although only two cascaded channels of WDM are described with reference to FIGS. 7–11, it is obvious for those skilled in the art that a multi-channel WDM can be achieved by cascading a plurality of channels of WDM.

The First Embodiment

Figure 1:
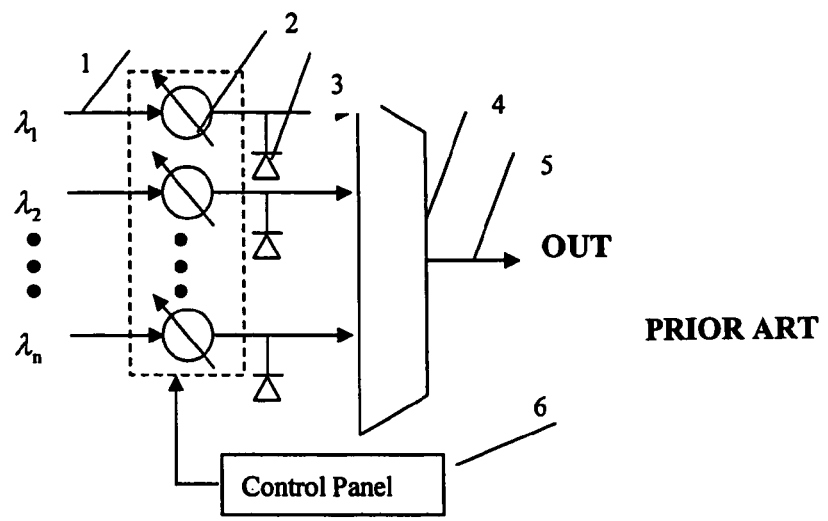
FIG. 1 is a schematic diagram showing a conventional optical-power adjustable WDM.
Figure 2:
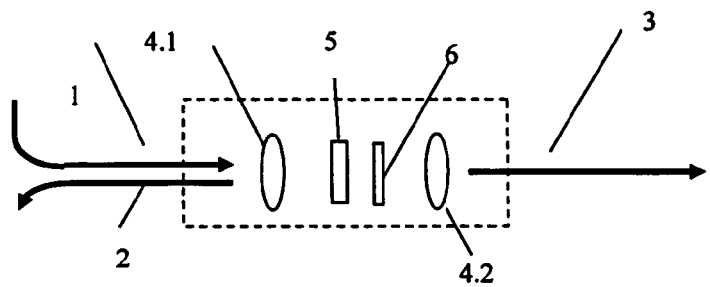
FIG. 2 is a schematic diagram showing one channel of the optical-power adjustable WDM in accordance with the first embodiment of the present invention, where a built-in tunable optical filter chip is integrated into a double optical fiber basic unit of WDM with three ports.

The first embodiment of the present invention is to integrate a built-in tunable optical filter chip into a thin film filter type double-fiber three-port unit to form one channel of an optical-power adjustable WDM, as shown in FIG. 2. It is composed of double fiber waveguides 1 and 2, a pair of collimating elements 4.1 and 4.2, a thin film filter 5, a tunable optical filter chip 6 serving as a variable optical attenuator used for attenuation, and a single fiber waveguide 3. Waveguides 1, 2, and 3 correspond to ports S1, S2, and S3 of the WDM of the present invention, respectively.

The above arranged optical-power adjustable WDM in accordance with the present invention can function as a multiplexer or a demultiplexer dependent on the direction of the incident light, which is appreciated by those skilled in the art.

As a demultiplexer shown in FIG. 2, its operating principle is that signals are incident on the thin film filter 5 through the collimating 4.1 via the fiber waveguide 1, the reflected signals from the thin film filter 5 pass the collimating element 4.1 and are coupled into the output waveguide 2, the transmitted signals with specific wavelength from film filter 5 are attenuated by the tunable optical filter chip 6 which function as a variable optical attenuator, then coupled into the output waveguide 3 through the collimating element 4.2. Obviously, this arrangement will be used as a multiplexer when the light is incident from waveguide 3.

The above mentioned tunable optical filter chip 6 is electrically-driven adjustable optical filter chip, and it can be a tunable optical filter chip based on F-P cavity, or a tunable optical filter chip based on liquid crystal technology, or a tunable optical filter chip based on magneto-optical technology. The detailed description on the electrically-driven adjustable optical filter chip will be made hereafter.

Although only one channel WDM is described with reference to FIG. 2, it is obvious for those skilled in the art that a multi-channel WDM can be achieved by cascading each channel of WDM, for example, the port S2 of the channel is connected to the port S1 of the next channel, and etc.

The Second Embodiment

Figure 3:
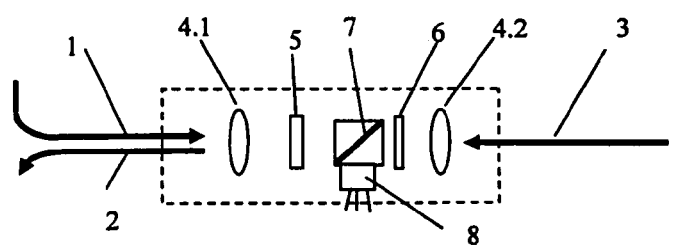
FIG. 3 is a schematic diagram showing one channel of the optical-power adjustable WDM with optical power detecting function in accordance with the second embodiment of the present invention, where a built-in tunable optical filter chip and an optical power detecting device are integrated into a double optical fiber basic unit of WDM with three ports.

The second embodiment is to integrate a built-in tunable optical filter chip and an optical power detecting device into a thin film filter based double-fiber three-port unit to form one channel of an optical-power adjustable WDM with optical power detecting function, as shown in FIG. 3. It is composed of double fiber waveguides 1 and 2, the pair of collimating elements 4.1 and 4.2, the thin film filter 5, the tunable optical filter chip 6 functioning as a variable optical attenuator used for attenuation, optical power splitter unit 7, an optical power detecting PIN (photodetector) 8, and the single fiber waveguide 3. This arrangement is used in multiplexer, and its operating principle is that the thin film filter 5 fully transmit a certain simple-wavelength signal from the optical fiber waveguide 3, while fully reflects a single wavelength signal or multi-wavelength signal from the optical fiber waveguide 1. A certain simple signal emitted from the optical fiber waveguide 3 is split by the optical power splitter unit 7 after being collimated by the collimating element 4.2, of which most signals transmitting the optical power splitter 7 are coupled into the optical fiber waveguide 2 through the thin film filter 5 and the collimating element 4.1, and a few detecting signals reach the optical power detecting PIN 8 after being reflected by the optical power splitter unit 7, to achieve power-detecting. At the same time, another single wavelength or multi-wavelength signal is incident upon the thin film filter 5 through the optical fiber waveguide 1 and the collimating 4.1, and is coupled into the optical fiber waveguide 2 through collimating 4.1 after being fully reflected by the thin film filter 5.

The above mentioned tunable optical filter chip 6 is electrically-driven adjustable optical filter chip, and it can be a tunable optical filter chip based on F-P cavity, or a tunable optical filter chip based on liquid crystal technology, or a tunable optical filter chip based on magneto-optical technology. The detailed description on the electrically-driven adjustable optical filter chip will be made hereafter.

The Third Embodiment

Figure 4:
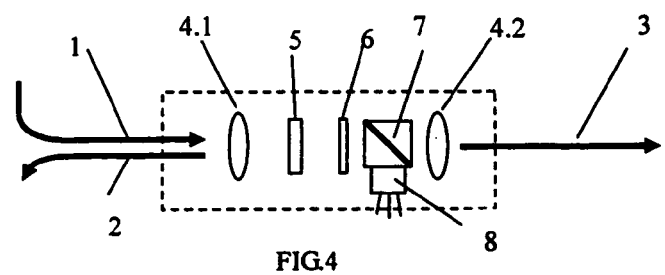
FIG. 4 is a schematic diagram showing one channel of the optical-power adjustable WDM with optical power detecting function in accordance with the third embodiment of the present invention, where a built-in tunable optical filter chips together with optical power detecting device are integrated into a double optical fiber basic unit of WDM with three ports.

The third embodiment is that a built-in tunable optical filter chip together with an optical power detecting device are used to form one channel of an optical-power adjustable WDM with the optical power detecting function, as shown in FIG. 4. It is composed of double fiber waveguides 1 and 2, the pair of collimating elements 4.1 and 4.2, the thin film filter 5, the tunable optical filter chip 6 functioning as a variable optical attenuator used for attenuation, optical power splitter unit 7, the optical power detecting PIN 8, and the single optical fiber waveguide 3. This arrangement is used in a demultiplexer, and its operating principle is that signals are incident into the thin film filter 5 through the optical fiber waveguide 1 and the collimating element 4.1, the signals reflected by the film filter 5 are coupled into the optical fiber waveguide 2 through collimating 4.1, and the signals with specific wavelength transmitted from the thin film filter 5 pass through tunable optical filter chip 6 and optical power splitter 7, most light signals are coupled into the output waveguide 3 after transmitting the optical power splitter 7 and the collimating element 4.2, while a small portion of the signals for detecting reach the optical power detecting PIN 8 after being reflected by the optical power splitter 7, to achieve the aim of detecting power.

The above mentioned tunable optical filter chip 6 is electrically-driven adjustable optical filter chip, and it can be a tunable optical filter chip based on F-P cavity, or a tunable optical filter chip based on liquid crystal technology, or a tunable optical filter chip based on magneto-optical technology. The detailed description on the electrically-driven adjustable optical filter chip will be made hereafter.

The Fourth Embodiment

Figure 5:
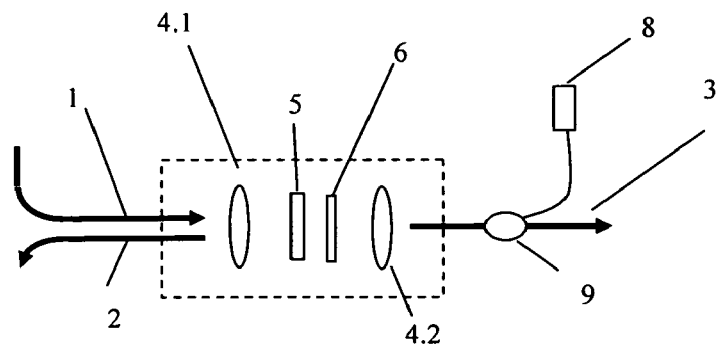
FIG. 5 is a schematic diagram showing one channel of the optical-power adjustable WDM with optical power detecting function in accordance with the fourth embodiment of the present invention, where a built-in tunable optical filter chip and an optical power detecting device are integrated into a double optical fiber basic unit of WDM with three ports.

The fourth embodiment is that an built-in adjustable optical filter chip together with an optical power detecting device are used to form one channel of an optical-power adjustable WDM with the optical power detecting function, as shown in FIG. 5. It is composed of optical fiber waveguides 1, 2, and 3, a coupler 9, the optical power detecting PIN 8, the thin film filter 5, the pair of collimating elements 4.1 and 4.2, and the tunable optical filter chip 6 that functions as an variable optical attenuator used for attenuation. Its operating principle is that signals from the optical fiber waveguide 1 are incident upon the thin film filter 5 after passing through the collimating element 4.1, the signals reflected from the thin film filter 5 are coupled into the optical fiber waveguide 2 through the collimating element 4.1, and those signal with specific wavelength transmitted from film filter 5 are split by the coupler 9 after passing through the tunable optical filter chip 6 and the collimating 4.2, and some light signals are coupled into the optical power detecting PIN 8, while most light signals enter into the optical fiber waveguide 3 after passing through coupler 9.

The Fifth Embodiment

Figure 6:
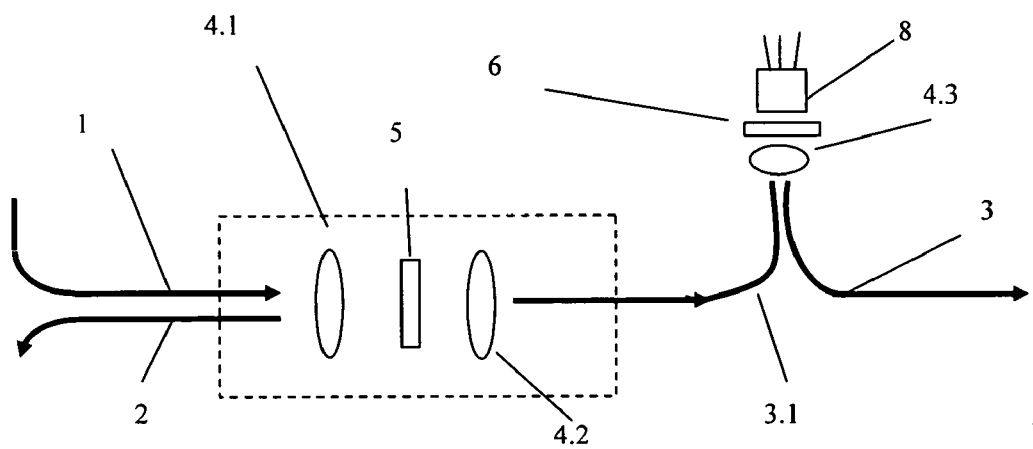
FIG. 6 is a schematic diagram showing one channel of the optical-power adjustable WDM with optical power detecting function in accordance with the fifth embodiment of the present invention, where a built-in tunable optical filter chip and an optical power detecting device are integrated into a double optical fiber basic unit of WDM with three ports.

The fifth embodiment is to integrate a tunable optical filter chip and an optical power detecting device to form an optical-power adjustable WDM with the optical power detecting function, as shown in FIG. 6. It is composed of optical fiber waveguides 1, 2, and 3, the optical power detecting PIN 8, the thin film filter 5, the collimating elements 4.1, 4.2, and a collimating element 4.3, and the tunable optical filter chip 6 that serves as a variable optical attenuator used for attenuation. Signals from optical fiber waveguide 1 are incident on the thin film filter 5 after passing through the collimating element 4.1, those signals reflected from the thin film filter 5 are coupled into the optical fiber waveguide 2 through the collimating element 4.2, those signals with specific wavelength transmitted from the thin film filter 5 pass through the collimating element 4.2 and the optical fiber waveguide 3.1, then reach the collimating element 4.3, some lights signals are coupled into the optical power detecting PIN 8 after being transmitted by the F-P cavity attenuation chip, while most signals being reflected by the F-P cavity based tunable optical filter chip 6 (that is, attenuation chip) enter into the output waveguide 3 after passing through the collimating element 4.3.

The above mentioned tunable optical filter chip 6 is electrically-driven adjustable optical filter chip, and it can be a tunable optical filter chip based on F-P cavity, or a tunable optical filter chip based on liquid crystal technology, or a tunable optical filter chip based on magneto-optical technology. The detailed description on the electrically-driven adjustable optical filter chip will be made hereafter.

The Sixth Embodiment

Figure 7:
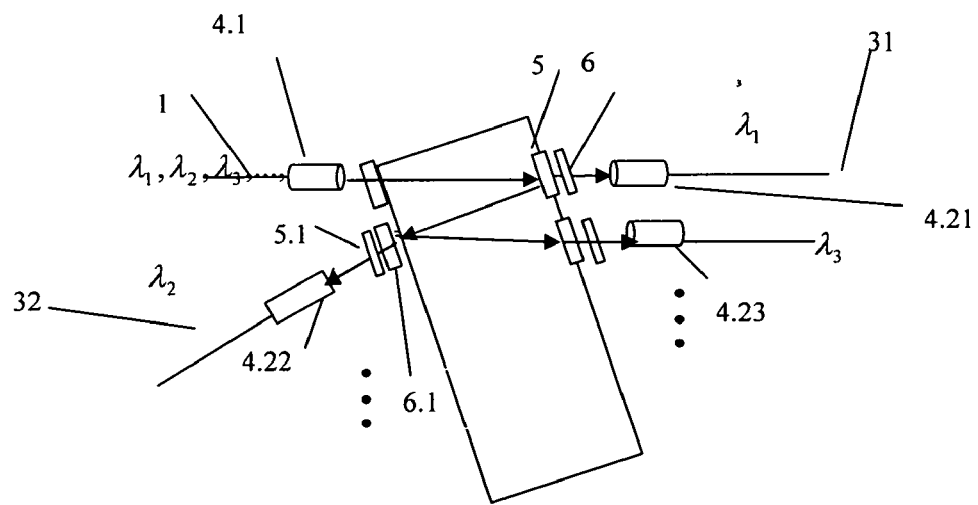
FIG. 7 is a schematic diagram showing one channel of the optical-power adjustable WDM or demultiplexer adopting the free space optical path structure in accordance with the sixth embodiment of the present invention.

The sixth embodiment uses a free space optical path structure WDM or demultiplexer. The first and second channels of the optical-power adjustable WDM which are composed of fiber waveguide 1, 31, and 32, collimating elements 4.1, 4.21, 4.22, and 4.23, thin film filters 5, tunable optical filter chips 6 that function as variable optical attenuators used for attenuation, are cascaded, as shown in FIG. 7. With regard to demultiplexer, its operating principle is that multi-wavelength signals are incident upon the film filter 5 after passing through the optical fiber waveguide 1 and the collimating element 4.1, signal $\lambda_1$ with certain wavelength transmitted from the thin film filter 5 are coupled into the output waveguide 31 after passing through the tunable optical filter chip 6 and the collimating element 4.21. Another signal $\lambda_2$ with certain wavelength in the signals reflected by the thin film filter 5 are coupled into the optical fiber waveguide 32 after passing through the thin film filter 5.1 and the tunable optical filter chip 6.1 and collimating element 4.22.

The above mentioned tunable optical filter chip 6 is electrically-driven adjustable optical filter chip, and it can be a tunable optical filter chip based on F-P cavity, or a tunable optical filter chip based on liquid crystal technology, or a tunable optical filter chip based on magneto-optical technology. The detailed description on the electrically-driven adjustable optical filter chip will be made hereafter.

The Seventh Embodiment

Figure 8:
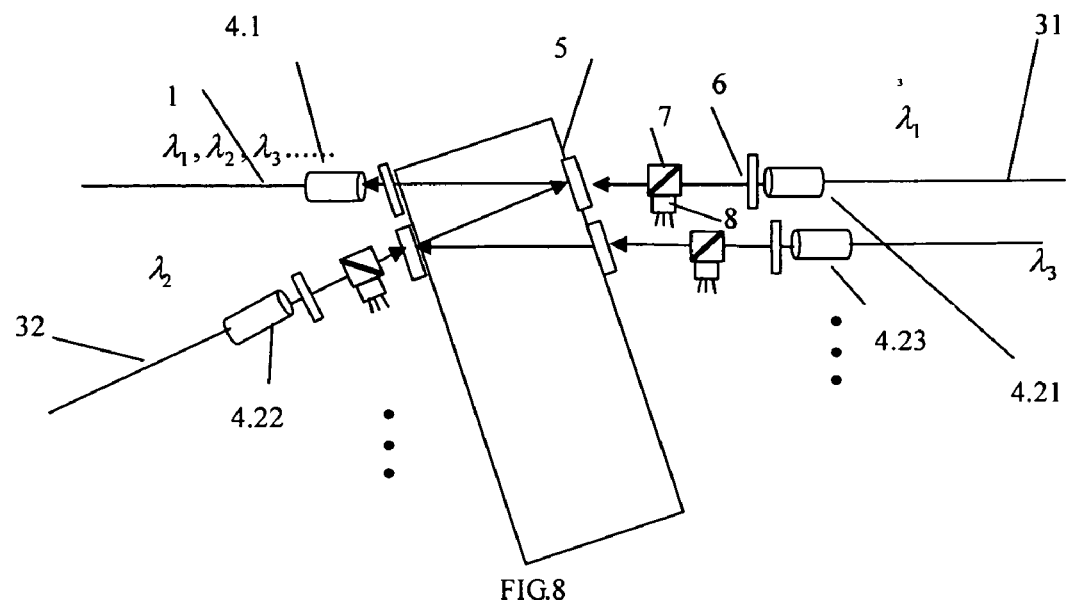
FIG. 8 is a schematic diagram showing the optical-power adjustable WDM with optical power detecting function adopting free space optical path structure in accordance with the seventh embodiment of the present invention, which is achieved by integrating tunable optical filter chips and optical power detecting devices with the thin film filter type WDM.
Figure 9:
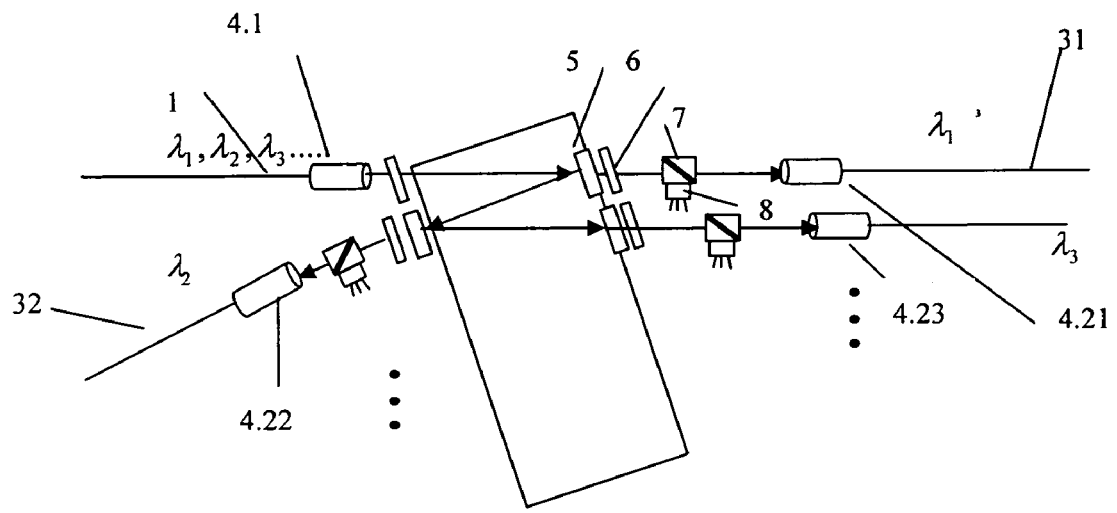
FIG. 9 is a schematic diagram showing an optical-power adjustable WDM with optical power detecting function in accordance with the eighth embodiment of the present invention, which is achieved by integrating tunable optical filter chips and optical power detecting devices with a thin film filter type WDM, using free space optical path structure.
Figure 10:
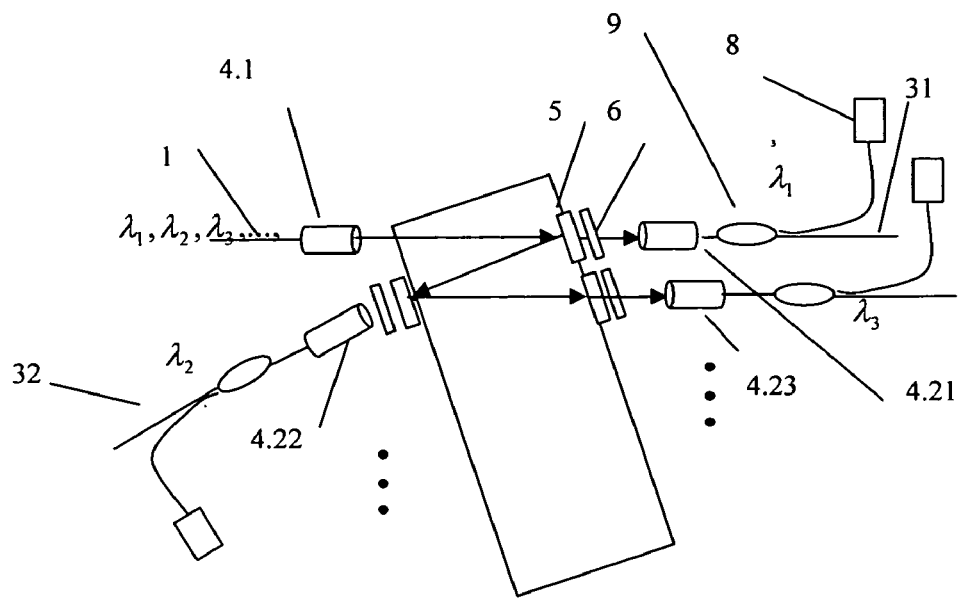
FIG. 10 is a schematic diagram showing an optical-power adjustable WDM in accordance with the ninth embodiment of the present invention.
Figure 11:
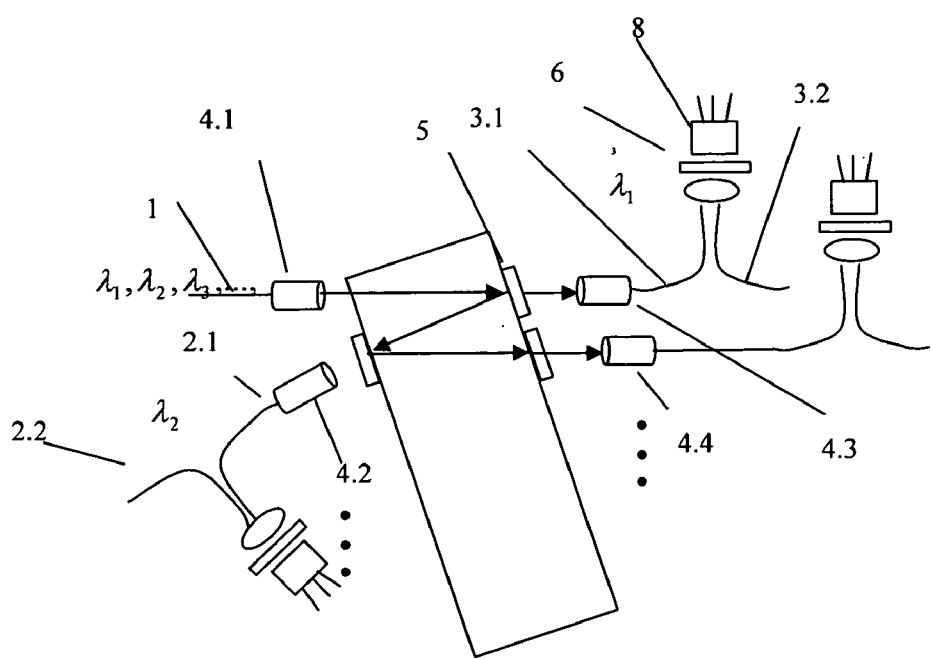
FIG. 11 is a schematic diagram showing an optical-power adjustable WDM in accordance with the tenth embodiment of the present invention.

The seventh embodiment uses a free space optical path structure thin film filter based WDM, built-in tunable optical filter chip, and optical power detecting device to form the optical-power adjustable WDM with the optical power detecting function, as shown FIG. 8. The first and second channels of the optical-power adjustable WDM_composed of optical fiber waveguides 1, 32 and 33, collimating elements 4.1, 4.21, and 4.23, thin film filters 5, tunable optical filters 6 that function as variable optical attenuator used for attenuation, optical power splitters 7, and optical power detecting PIN 8. This arrangement is used in multiplexer. Certain wavelength signal emitted from the optical fiber waveguide 31 is split by the optical power splitter 7 after being collimated by the collimating element 4.21, most signals transmitting optical power splitters 7 are coupled into the optical fiber waveguide 1 after passing through the thin film filter 5 and the collimating element 4.1, while a small portion of detecting signals reach the optical power detecting PIN 8 after being reflected by the optical power splitter 7, and achieve the aim of power detection; at the same time, another specified wavelength signal are incident upon the film filter 5 after passing through the optical fiber waveguide 32, the equality unit, and collimating element 4.22, and coupling enters into optical fiber waveguide 1 after being fully reflected by thin film filter 5 and passing through collimating element 4.1, and achieve the aim of Multiplexer. The demultiplexer can be got easily by the skilled in the art.

The above mentioned tunable optical filter chip 6 is electrically-driven adjustable optical filter chip, and it can be a tunable optical filter chip based on F-P cavity, or a tunable optical filter chip based on liquid crystal technology, or a tunable optical filter chip based on magneto-optical technology.

The principles of the eighth to tenth embodiment are similar to that of the above-mentioned embodiments.

Now, descriptions will be made on the structure and the operating principle of the tunable optical filter chip based on F-P cavity which functions as a variable optical attenuator, as shown in FIG. 12A and FIG. 12B.

FIG. 12A is a schematic diagram showing structural features of the tunable optical filter chip based on F-P cavity, and FIG. 12B is a schematic diagram showing the attenuation curve of the tunable optical filter chip based on F-P cavity.

The built-in tunable optical filter chip based on F-P cavity adopted by the present invention is a Fabry-Perot cavity filter, and its operating principle is based on the principle of multiple-beam interference. Both the transmitted light and the reflected light produce multiple-beam interference and lead to resonance phenomenon, thus, frequency selective characteristics occurs. It is assumed that the refractive indexes of the media at the two sides of the reflective film are equal, the reflectivity of the two sides of the film is R, the distance between the two reflecting surfaces, that is the length of the cavity, is 1, the refractive index of the medium in the cavity is n, the velocity of light in vacuum is c, and the additional absorption loss is ignored. When the transmission coefficient of the transmitted light beam $\tau=1/[1+(2F/\pi)2\times \sin 2(2\pi nlf/c)]$, it is established that $FSR=c/2nl$, $dF=c(1-R)/2\pi nlR1/2$. The function of frequency selection, that is tuning and filtering the waves, can be achieved by adjusting length of the cavity 1. Typically, the thin-film technique related to this F-P chip is used to increase the reflectivity of a F-P reflector. It is appreciated that if a bandwidth at 10.0 dB or bandwidth at 20.0 dB is sufficient for a specific filted wavelength, when the wavelength is shifting during the tuning of the filter, it can be regarded as continuously variable attenuation of the device on this specified wavelength, that is to say, functions as a variable optical attenuator.

FIG. 13A and FIG. 13B are schematic diagrams showing the arrangement of the tunable optical filter based on chip liquid crystal.

Now, the principle of the tunable optical filter based on chip liquid crystal, which is used as a variable optical attenuator, will be described. The polarization state of the incident polarized light generated by a polarizer is changed by using the rotating characteristics of liquid crystal, and light subject to change is output through an analyzer, as a result, attenuation is made. The collimated light beam in certain polarized direction enters into a birefringent crystal, and is divided into two polarized lights, which are vertical with each other in the polarization state, then enter into the liquid crystal. When the driving voltage is not applied, the two polarized light beams are rotated a certain angle by the liquid crystal, then output from a collimator after being combined by a second birefringent crystal. When the driving voltage at the two ends of the liquid crystal changes, electrically-controlled birefringent effect occurs, and the liquid crystal molecular layer starts to change its orientation as the voltage changes, which makes the refractive indexes of Light o and Light e change, that is, to change the refractivity of Light o and Light e: $\Delta n = n_o - n_e$, thus, the phase difference $\phi = 2\pi \Delta n d/\lambda$, which is produced after the electro-optic birefringent effect of the liquid crystal, can be obtained. Therefore, the light beam is not polarized light any more after passing through the liquid crystal, but becomes partially polarized light, and it will be split when it enters into the second crystal, thus be attenuated. As shown in FIG. 13A, the tunable optical filter chip 6 based on chip liquid crystal which functions as a variable optical attenuator for attenuation is such arranged that it comprises a birefringent crystal 11, a liquid crystal 12, a birefringent crystal 13. FIG. 13.2 shows a liquid crystal with specific performance. The incident light signal is incident on crystal 12 through the collimating element 10, the voltage between the electrodes of the liquid crystal is changed, the light signal is scattered after transmitting the liquid crystal 12, and only the optical power signal, which is a function of the voltage, can be coupled into the collimating element 10, thus the attenuation function is achieved. In this embodiment, the liquid crystal 12 is the tunable optical filter chip 6 based on liquid crystal technology, that is, the optical filter chip used as the variable optical attenuator.

FIG. 14 is a schematic diagram showing the arrangement of the tunable optical filter chip based magneto-optical technology.

The principle of the tunable optical filter chip based on the magneto-optical technology, which is used for attenuation, is similar to that based on liquid crystal technology. The difference lies in that the rotation characteristics the magneto-optical crystal is used here. As shown FIG. 14, the tunable optical filter chip based on the magneto-optical technology is such arranged that it comprises a birefringent crystal 11, a magneto-optical crystal 15, and a birefringent crystal 3.

The preferred embodiments described herein are illustrative and not restrictive, and the modification and variations may be made without departing from the spirit of the invention. The scope of the invention is defined by the appended claims.

The present invention claims the benefit of Chinese Utility Model Patent Application No. 2003101116539, filed on Dec. 25, 2003, the disclosure of which is incorporated herein by reference in its entirety.

The invention claimed is:

1. An integrated optical-power adjustable wavelength-division multiplexer (WDM). comprising:
a plurality of channels, each channel having a first port, a second port and a third port, the second port of one channel being connected to the first port of the next channel, the first port of each channel having a wave guide, the third port of each channel having a waveguide, each channel comprising a pair of collimating elements composed of a first collimating element and a second collimating element, a thin film filter and a tunable optical filter chip functioning as a variable optical attenuator,
wherein the tunable optical filter chip is set between the film filter and the third port for each channel, thereby the respective tunable optical filter chip is integrated into the corresponding internal optical path for each channel of the WDM to achieve optical-power control for each channel of the WDM.

2. The integrated optical-power adjustable WDM according to claim 1, wherein as a variable optical attenuator unit, the tunable optical filter chip is one of a tunable optical filter chip based on a Fabrey-Perot (F-P) cavity, a tunable optical filter chip based on liquid crystal technology and a tunable optical filter chip based on magneto-optic technology.

3. The integrated optical-power adjustable WDM according to claim 2, wherein the tunable optical filter chip is set between the film filter and the second collimating element for each channel.

4. The integrated optical-power adjustable WDM according to claim 2, wherein a PIN is located in front or after the tunable optical filter chip for each channel as an optical power detecting device.

5. The integrated optical-power adjustable WDM according to claim 2, wherein a coupler is located behind the second collimating element and a PIN is coupled with the coupler.

6. The integrated optical-power adjustable WDM according to claim 2, wherein the tunable optical filter chip is set between the second collimating element and a third collimating element, and a PIN is coupled with tunable optical filter chip.

7. The integrated optical-power adjustable WDM according to claim 2, wherein a second port of one channel and a first port of next channel communicate with each other through a waveguide or a free space optical path.

8. The integrated optical-power adjustable WDM according to claim 1, wherein the tunable optical filter chip is set between the film filter and the second collimating element for each channel.

9. The integrated optical-power adjustable WDM according to claim 1, wherein a PIN is located in front or after the tunable optical filter chip for each channel as an optical power detecting device.

10. The integrated optical-power adjustable WDM according to claim 1, wherein a coupler is located behind the second collimating element and a PIN is coupled with the coupler.

11. The integrated optical-power adjustable WDM according to claim 1, wherein the tunable optical filter chip is set between the second collimating element and a third collimating element, and a PIN is coupled with tunable optical filter chip .

12. The integrated optical-power adjustable WDM according to claim 1, wherein a second port of one channel and a first port of next channel communicate with each other through a waveguide or a free space optical path.

* * * * *